US010552714B2

(12) United States Patent
Kiapour et al.

(10) Patent No.: US 10,552,714 B2
(45) Date of Patent: Feb. 4, 2020

(54) GENERATING A DIGITAL IMAGE USING A GENERATIVE ADVERSARIAL NETWORK

(71) Applicant: eBay Inc., San Jose, CA (US)

(72) Inventors: Mohammadhadi Kiapour, San Francisco, CA (US); Shuai Zheng, Berkeley, CA (US); Robinson Piramuthu, Oakland, CA (US); Omid Poursaeed, New York, NY (US)

(73) Assignee: eBay Inc., San Jose, CA (US)

( * ) Notice: Subject to any disclaimer, the term of this patent is extended or adjusted under 35 U.S.C. 154(b) by 134 days.

(21) Appl. No.: 15/923,347

(22) Filed: Mar. 16, 2018

(65) Prior Publication Data

US 2019/0286950 A1 Sep. 19, 2019

(51) Int. Cl.
| | |
|---|---|
| *G06K 9/00* | (2006.01) |
| *G06K 9/66* | (2006.01) |
| *G06K 9/62* | (2006.01) |
| *G06K 9/32* | (2006.01) |
| *G06Q 30/06* | (2012.01) |
| *G06F 16/532* | (2019.01) |

(Continued)

(52) U.S. Cl.
CPC ............ *G06K 9/66* (2013.01); *G06F 16/532* (2019.01); *G06F 16/5838* (2019.01); *G06F 16/9535* (2019.01); *G06K 9/00369* (2013.01); *G06K 9/3233* (2013.01); *G06K 9/6256* (2013.01); *G06Q 30/0625* (2013.01); *G06Q 30/0631* (2013.01); *G06Q 30/0643* (2013.01)

(58) Field of Classification Search
CPC .... G06K 9/66; G06K 9/00369; G06K 9/3233; G06K 9/6256; G06F 16/5838; G06F 16/9535; G06F 16/532; G06Q 30/0625; G06Q 30/0631; G06Q 30/0643
See application file for complete search history.

(56) References Cited

U.S. PATENT DOCUMENTS

| | | | |
|---|---|---|---|
| 9,786,084 B1 * | 10/2017 | Bhat | ........................ G06T 7/11 |
| 10,210,631 B1 * | 2/2019 | Cinnamon | ............ G06T 11/003 |
| 2017/0148226 A1 * | 5/2017 | Zhang | ................. G06F 17/5081 |

(Continued)

FOREIGN PATENT DOCUMENTS

| | | |
|---|---|---|
| CN | 106952239 A | 7/2017 |
| CN | 106997380 A | 8/2017 |

*Primary Examiner* — Sean T Motsinger
(74) *Attorney, Agent, or Firm* — Schwegman Lundberg & Woessner, P.A.

(57) ABSTRACT

Various embodiments described herein utilize multiple levels of generative adversarial networks (GANs) to facilitate generation of digital images based on user-provided images. Some embodiments comprise a first generative adversarial network (GAN) and a second GAN coupled to the first GAN, where the first GAN includes an image generator and at least two discriminators, and the second GAN includes an image generator and at least one discriminator. According to some embodiments, the (first) image generator of the first GAN is trained by processing a user-provided image using the first GAN. For some embodiments, the user-provided image and the first generated image, generated by processing the user-provided image using the first GAN, are combined to produce a combined image. For some embodiments, the (second) image generator of the second GAN is trained by processing the combined image using the second GAN.

20 Claims, 10 Drawing Sheets

(51) Int. Cl.
*G06F 16/583* (2019.01)
*G06F 16/9535* (2019.01)

(56) References Cited

U.S. PATENT DOCUMENTS

| | | | |
|---|---|---|---|
| 2017/0200265 A1* | 7/2017 | Bhaskar | G06T 7/0006 |
| 2017/0278135 A1* | 9/2017 | Majumdar | G06Q 30/0256 |
| 2017/0337682 A1* | 11/2017 | Liao | G06T 7/30 |
| 2017/0351935 A1* | 12/2017 | Liu | G06K 9/6256 |
| 2018/0047192 A1* | 2/2018 | Kristal | G06T 11/60 |
| 2018/0107685 A1* | 4/2018 | Kale | G06K 9/6212 |
| 2019/0188882 A1* | 6/2019 | Son | G06T 9/002 |
| 2019/0197670 A1* | 6/2019 | Ferrer | G06T 5/005 |
| 2019/0251401 A1* | 8/2019 | Shechtman | G06K 9/66 |
| 2019/0251612 A1* | 8/2019 | Fang | G06F 16/532 |
| 2019/0259190 A1* | 8/2019 | Kristal | G06Q 30/0643 |
| 2019/0266442 A1* | 8/2019 | Malur Srinivasan | G06K 9/6254 |
| 2019/0286950 A1* | 9/2019 | Kiapour | G06K 9/00369 |

* cited by examiner

GENERATING A DIGITAL IMAGE USING A GENERATIVE ADVERSARIAL NETWORK

TECHNICAL FIELD

The present disclosure relates generally to digital images and, more particularly, generating digital images using a generative adversarial network.

BACKGROUND

Digital images are commonly used for many different purposes in computer systems, especially with respect to selling and buying goods and services through an e-commerce website or software platform. For instance, it is commonplace to list a product item (hereinafter, "item") for sale on an online marketplace and include one or more digital images of the item with the listing. Depending on the seller, the type of listing, and the item being listed, the seller may use a digital image depicting the actual item for sale (e.g., when the item for sale is an item previously owned or used), or use a stock digital image that represents the item for sale (e.g., a stock digital image provided or used by the manufacturer to sell instances of the item).

Generally, it is a challenge for users to search for items on an e-commerce website/platform by keywords. For instance, it can be difficult for users to provide appropriate or exact keywords to describe an appearance of an item, especially one relating to fashion (hereafter, "fashion item"), to search for the fashion item.

As a solution, technologies have emerged that permit a user to provide a digital image (e.g., by capturing it using their mobile device) that depicts an object of interest and use the captured digital image to search (e.g., on an e-commerce site/platform) for an item that matches the depicted object of interest. Such a search may involve the user providing the digital image in place of, or in addition to, one or more search keywords to search for the item. For example, a user can capture a digital image of a human individual (e.g., in public or on the "street") wearing a fashion item (i.e., the object) of interest to the user, and use the captured digital image to search for the depicted fashion item on an e-commerce website/platform.

For some technologies, facilitating an image-based search (also known as a visual search) of an item, using a user-provided digital image depicting an object of interest as search input, involves generating, based on the user-provided digital image, one or more stock-quality digital images that depict an item that is identical or similar to the object of interest depicted in the user-provided digital image. The one or more generated stock-quality digital images can then be used to search for items that are similar to the item depicted in the generated stock-quality digital images. The items found by the search may be, for example, items listed for sale on an e-commerce site/platform that are represented in the sale listing by one or more stock digital images (e.g., ones provided by the item manufacturers).

Unfortunately, it can be technically challenging to perform stock-quality digital image generation based on a user-provided digital image depicting an item such that the generated image resulting from the image generation is similar enough to the stock digital image representing the item (e.g., in an item catalog of an e-commerce website/platform) that the generated image can be used to search for the stock digital image using on the generated image. This is particularly true where a user-provided digital image, depicting a fashion item as found in the public or on the "street," is used to generate a stock-quality image (e.g., to perform a search for a stock image representing the fashion item). Such a user-provided digital image can include, for example, where the user-provided digital image is captured by the user in public and depicts a human individual wearing the fashion item of interest. In such an instance, the human individual's pose may orient the fashion item in the user-provided digital image differently than it is depicted in a stock image used to represent the fashion item on an e-commerce site/platform, the fashion item depicted in the user-provided image might have partial self-occlusions, or the user-provided image may be one taken under challenging lighting conditions. As a result of such difference,

BRIEF DESCRIPTION OF THE DRAWINGS

Various ones of the appended drawings merely illustrate example embodiments of the present disclosure and cannot be considered as limiting its scope.

Figure 1:
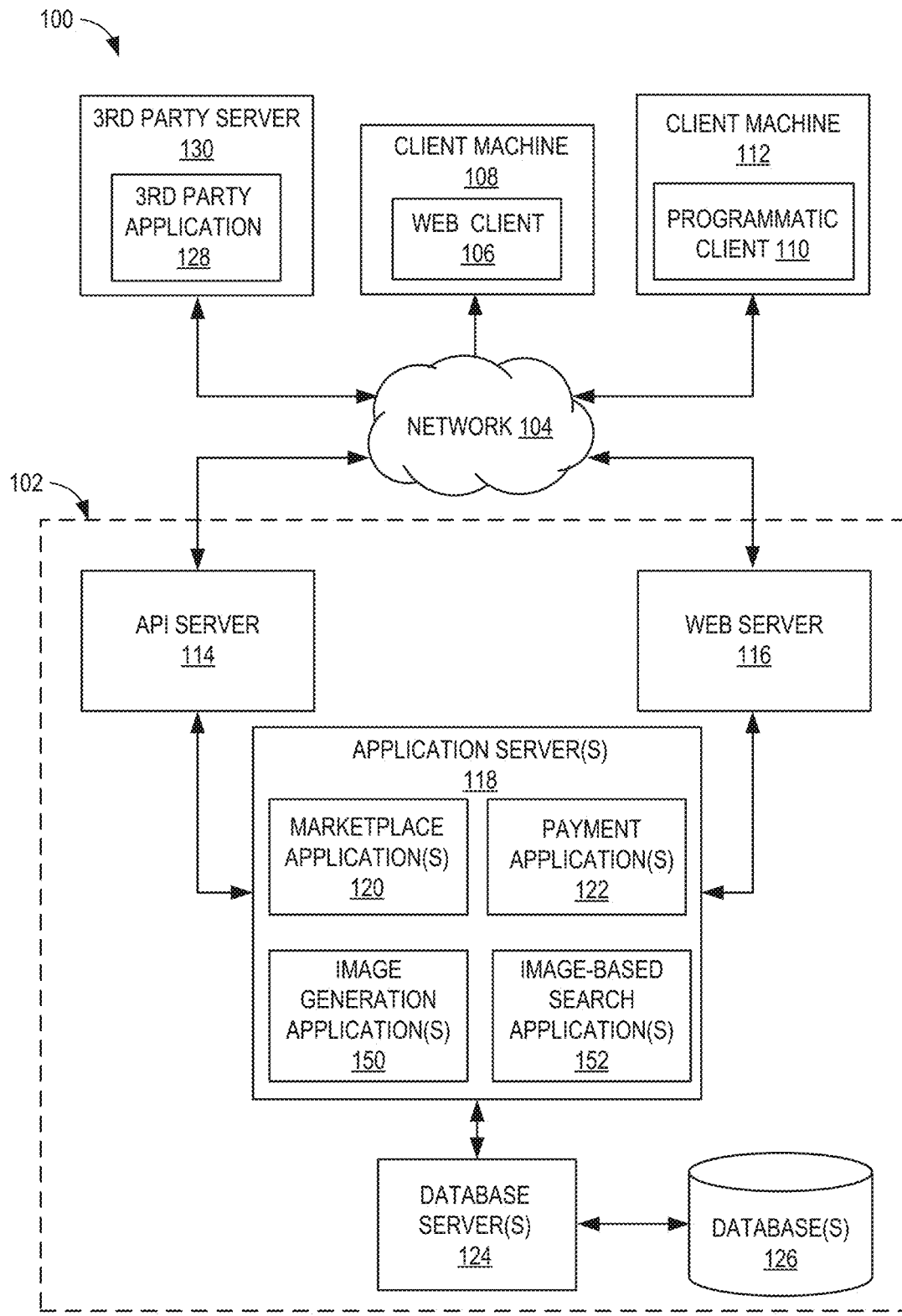
FIG. 1 is a network diagram depicting an example client-server system, within which an embodiment may be deployed.

The headings provided herein are merely for convenience and do not necessarily affect the scope or meaning of the terms used.

DETAILED DESCRIPTION

Various embodiments described herein utilize multiple levels of generative adversarial networks (GANs) to facilitate generation of digital images (hereafter, "images"). More particularly, some embodiments utilize multiple levels of GANs to train a plurality of digital image generators that, once trained, can generate a stock-quality digital image based on an input digital image. The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Some embodiments comprise a first GAN and a second GAN coupled to the first GAN, where the first GAN includes an image generator and at least two discriminators, and the second GAN includes an image generator and at least one discriminator. According to some embodiments, the at least two discriminators of the first GAN comprise: one discriminator that attempts to distinguish between real and generated images; and another that attempts to distinguish whether image pairs, each including a user-captured image (e.g., user photos capturing fashion from the public or on the "street") and stock/generated image, are associated or not associated. According to some embodiments, the at least one discriminator of the second GAN comprises a discriminator that attempts to distinguish between real and generated images. Through use of the first and second GANs, various embodiments can translate a user-provided image from a domain (e.g., that includes pose information of a human individual).

Depending on the embodiment, an image generator of a GAN may comprise a neural network, such as an encoder-decoder neural network, which may skip connections between the encoder and the decoder. Alternatively, the image generator may comprise another type of machine learning (ML) model. A discriminator of a GAN may comprise a neural network implementing a classifier, which may be trained using supervised learning. Alternatively, the discriminator may comprise another type of ML model.

During a training operation, some embodiments pre-process a user-provided image (e.g., image captured by the user of a human individual on the "street" wearing a fashion item) prior to processing the user-provided image by the first GAN and the second GAN (e.g., training the first and second GANs using the user-provided image). For instance, an embodiment may pre-process the user-provided image by performing a person segmentation process on the user-provided image (e.g., segments out the foreground from the background) and placing the resulting image segments (e.g., foreground segments) on a white background. As used herein, the person segmentation process can comprise segmenting a human individual depicted in an image (e.g., digital photo) from the remainder of the image. A person segmentation process may comprise: upper-body segmentation, which provides a segment that represents an upper body of a human individual; lower-body segmentation, which provides a segment represents a lower body of the human individual; or whole-body segmentation, which provides a segment that represents the whole body of the human individual. By performing a person segmentation process, the resulting image segments can assist in focusing on one or more objects of interest (e.g., fashion item worn by the human individual depicted) in the user-captured image. Subsequently, an embodiment may perform human pose estimation on at least one of the resulting image segments to identify key points within the resulting image segments (e.g., four torso key points for a fashion item comprising a clothing top, such as t-shirt), and the embodiment can crop the at least one resulting image segments based on the identified key points. The key points may identify different points of interest on a human individual depicted in the resulting image segments. At the end of pre-processing, the pre-processed (e.g., by a person segmentation process, placement on white background, and cropping based on human pose estimation) user-provided image may be provided to the first GAN and the second GAN for processing or, more specifically, to an image generator of the first GAN and a second generator of the second GAN for processing.

According to some embodiments, the (first) image generator of the first GAN is trained by processing a user-provided image (e.g., pre-processed image) using the first GAN. The user-provided image may one from a plurality of user-provided images that used to train the image generators of the first and second GANs. The plurality of user-provided images may be stored as, or regarded as, training data for the image generators. The training operations described herein may be performed using two or more user-provided images provided by the training data. For some embodiments, processing the user-provided image using the first GAN results in a first generated image being generated by the first image generator of the first GAN based on the user-provided image (e.g., using the user-provided image as an input to the first image generator). For some embodiments, the user-provided image (e.g., pre-processed image) and the first generated image, generated by processing the user-provided image using the first GAN, are combined (e.g., concatenated) to produce a combined image. For some embodiments, the (second) image generator of the second GAN is trained by processing the combined image using the second GAN. Additionally, for some embodiments, processing the combined image using the second GAN results in a second generated image being generated by the second image generator of the second GAN based on the user-provided image (e.g., using the user-provided image as an input to the first image generator). As a result, some embodiments produce the first generator trained by the first stage of GANs, and the second generator trained by the second stage of GANs.

The first generated image, the second generated image, or both may represent a stock-quality image generated by an image generator, in accordance with an embodiment.

Eventually (e.g., after sufficient training), at least one of the first image generator or the second image generator may be used to perform an image-based (visual) search for one or more images in an image database based on an input image. For example, one or both of the first and second generators can be used with a user-provided image to generate a stock-quality image based on the user-provided image. The input image may comprise a new user-provided image that is different from any user-provided image used to train the image generators of the first and second GANs. As such, the input image may be an image not included by training data used to train the first and second GANs. The stock-quality image generated using the first and second generators can be used to perform a visual search on an online marketplace system (e.g., e-commerce website) for one or more stock images of items (e.g., stock images of fashion items) that are similar to an item depicted in the user-provided image (e.g., user-captured image of a human individual on the "street" that is wearing a fashion item of interest to a user using the visual search). This may be used on the online marketplace system, for example, to permit a user to find an item on the online marketplace system, to provide item recommendations (e.g., fashion product item recommendations), or automatically suggests one or more stock images to a selling user when they upload an image (e.g., captured or acquired by the selling user) for an item posted/listed for sale on the e-commerce site/platform. The suggested images may be used in place of, or in addition to, the user-uploaded image for the item posting/listing. The stock-quality image generated may be used in an online image-based search engine.

The one or more images (e.g., stock images) that result from (e.g., identified by) the image-based search may be used to search for one or more items on an online marketplace system (e.g., e-commerce website), or to present a user (e.g., seller) on the online marketplace system with one or more suggested images to be used in place of, or in addition to, another image the user uses (e.g., uploads) for an item listed for sale on the online marketplace system.

As used herein, a stock-quality (of an object) comprises an image that attempts to represent or imitate one or more qualities associated with a stock image (of the object), which typically comprises a photograph (of the object) taken professionally (e.g., with professional lighting, equipment, and personnel). As used herein, a stock image may include one provided by a stock photography company or one taken for marketing or commercial use (e.g., physical or online magazine or product catalog).

Depending on the embodiment, processing the user-provided image by the first GAN may comprise training the first GAN using the user-provided image. For instance, processing the user-provided image by the first GAN may comprise: generating, by the first image generator of the first GAN, the first generated image based on the user-provided image; determining, by a (first) discriminator of the first GAN, whether the first generated image is a real image based on (e.g., in comparison to) a ground-truth image (e.g., representing a ground truth with respect to the current user-provided image, such as a stock image depicting the same object of interest as the user-provided image); determining, by another (second) discriminator of the first GAN, whether the user-provided image and the first generated image are associated; and adjusting the first image generator of the first GAN based on the results of the first discriminator and the second discriminator. For some embodiments, adjusting the first image generator of the first GAN constitutes training the first image generator, which can cause the first image generator to generate more realistic images. Adjusting the first image generator of the first GAN may comprise adjusting at least one weight or another attribute of the first image generator (e.g., via back-prorogation update).

Depending on the embodiment, processing the combined image by the second GAN may comprise training the second GAN using the combined image. For instance, processing the combined image by the second GAN may comprise: generating, by the second image generator, a second generated image based on the combined image; determining, by a discriminator of the second GAN, whether the second generated image is associated with the user-provided image; and adjusting the second image generator based on the result of the discriminator. Processing the combined image by the second. GAN may further comprise calculating, by a L-2 loss function, a difference between the second generated image and a ground-truth image (e.g., same one used by the first discriminator of the first GAN), and adjusting the second image generator further based on the difference. For some embodiments, adjusting the second image generator of the second GAN constitutes training the second image generator, which can cause the second image generator to generate more realistic images. Adjusting the second image generator of the second GAN may comprise adjusting at least one weight or another attribute of the second image generator (e.g., via back-prorogation update).

Various embodiments described herein improve a machine's (e.g., computer system's) ability to perform stock-quality image generation using a user-provided image, particularly where an object (e.g., item) of interest depicted in a user-provided image appears quite differently from a stock image representing the same object (e.g., item). For instance, the user-provided digital image may depict a fashion item as found in the public or on the "streets," and some embodiments described herein facilitate generating of a stock-quality image of the fashion item based on the user-provided image while overcoming various issues that may hamper conventional image generation techniques. Issues that may be overcome by an embodiment described herein can include, without limitation, the orientation of the fashion item within the user-provided image (e.g., due to the wearer's pose in the user-provided image), an occlusion included within the user-provided image, or a lighting condition under which the user-provided image is captured. According to some embodiments, techniques described here are used to improve the performance of a visual search based on a user-provided image.

Although various embodiments are described with respect to an object of interest (within a user-provided image) comprising a product item, techniques described herein may also apply to where the object of interest comprises a non-product item. Additionally, although various embodiments are described with respect to an item comprising a clothing top, techniques described herein may also apply to other items of clothing, such as pants, hats, shoes, and the like, or a combination of clothing (e.g., a combination including a clothing top and pants).

Reference will now be made in detail to embodiments of the present disclosure, examples of which are illustrated in the appended drawings. The present disclosure may, however, be embodied in many different forms and should not be construed as being limited to the embodiments set forth herein.

FIG. 1 is a network diagram depicting an example client-server system 100, within which an embodiment may be deployed. A networked system 102, in the example forms of a network-based marketplace or publication system, provides server-side functionality, via a network 104 (e.g., the Internet or a Wide Area Network (WAN)) to one or more clients. FIG. 1 illustrates, for example, a web client 106 (e.g., a browser, such as the Internet Explorer browser developed by Microsoft Corporation of Redmond, Wash.) and a programmatic client 110 executing on respective client machines 108 and 112.

An application programming interface (API) server 114 and a web server 116 are coupled to, and provide programmatic and web interfaces respectively to, one or more application servers 118. The application servers 118 host one or more marketplace applications 120, payment applications 122, image generation applications 150, and image-based search applications 152. The application servers 118 are, in turn, shown to be coupled to one or more database servers 124 that facilitate access to one or more databases 126.

The marketplace applications 120 may provide a number of online marketplace functions and services to users who access the networked system 102, such as searching for items for sale, posting items for sale, and facilitating purchase of items (e.g., between two users or between a user and the marketplace provider). The payment applications 122 may provide a number of payment services and functions to users. The payment applications 122 may allow users to accumulate value (e.g., in a commercial currency, such as the U.S. dollar, or a proprietary currency, such as "points") in accounts, and then later to redeem the accumulated value for product items (e.g., goods or services) that are made available via the marketplace applications 120. The image generation applications 150 may provide image generation functions or services, in accordance with various embodiments described herein. The image generation applications 150 can facilitate generation of a stock-quality image based on a user-provided image, such as a user-captured image of a fashion item found in public or on the "street". The image-based search applications 152 may provide image-based search functions or services. The image-based search applications 152 can use a stock-quality image, generated based on a user-provided image by at least one of the image generation applications 150, as a search input for searching for one or more images (e.g., stock images) on an image database. The image generation applications 150, the image-based search applications 152, or both may be used by one or more functions or services of the marketplace applications 120. For instance, at least one of the image generation applications 150 may be used to generate, based on an image depicting an item and provided by a user of an online marketplace, a stock-quality image representing the item on the online marketplace. At least one of image-based search applications 152 may use the stock-quality image generated by the least one of the image generation applications 150 to perform an image-based search for one or more items on the online marketplace.

While the marketplace, payment, image generation, and image-based search applications 120, 122, 150, and 152 are shown in FIG. 1 to form part of the networked system 102, it will be appreciated that, in some embodiments, any of the applications may form part of a service that is separate and distinct from the networked system 102. For example, for some embodiments, the payment applications 122 may form part of a payment service that is separate and distinct from the networked system 102.

Further, while the system 100 shown in FIG. 1 employs a client-server architecture, the embodiments are, of course, not limited to such an architecture, and could equally well find application in a distributed, or peer-to-peer, architecture system, for example. The various marketplace, payment, image generation, and image-based search applications 120, 122, 150, and 152 could also be implemented as standalone software programs, which do not necessarily have networking capabilities. Further, one or more of the image generation and image-based search applications 150 and 152 can be implemented as part of the marketplace applications 120.

The web client 106 accesses the various marketplace, payment, image generation, and image-based search applications 120, 122, 150, and 152 via the web interface supported by the web server 116. Similarly, the programmatic client 110 accesses the various services and functions provided by the various marketplace, payment, image generation, and image-based search applications 120, 122, 150, and 152 via the programmatic interface provided by the API server 114. The programmatic client 110 may, for example, be a seller application to enable sellers (e.g., seller users) to author and manage listings on the networked system 102 in an offline manner, and to perform batch-mode communications between the programmatic client 110 and the networked system 102.

FIG. 1 also illustrates a third-party application 128 executing on a third-party server machine 130 as having programmatic access to the networked system 102 via the programmatic interface provided by the API server 114. For example, the third-party application 128 may, utilizing information retrieved from the networked system 102, support one or more features or functions on a website hosted by a third party. The third-party website may, for example, provide one or more promotional, marketplace, payment, image generation, or image-based search functions that are supported by the relevant applications of the networked system 102.

Figure 2:
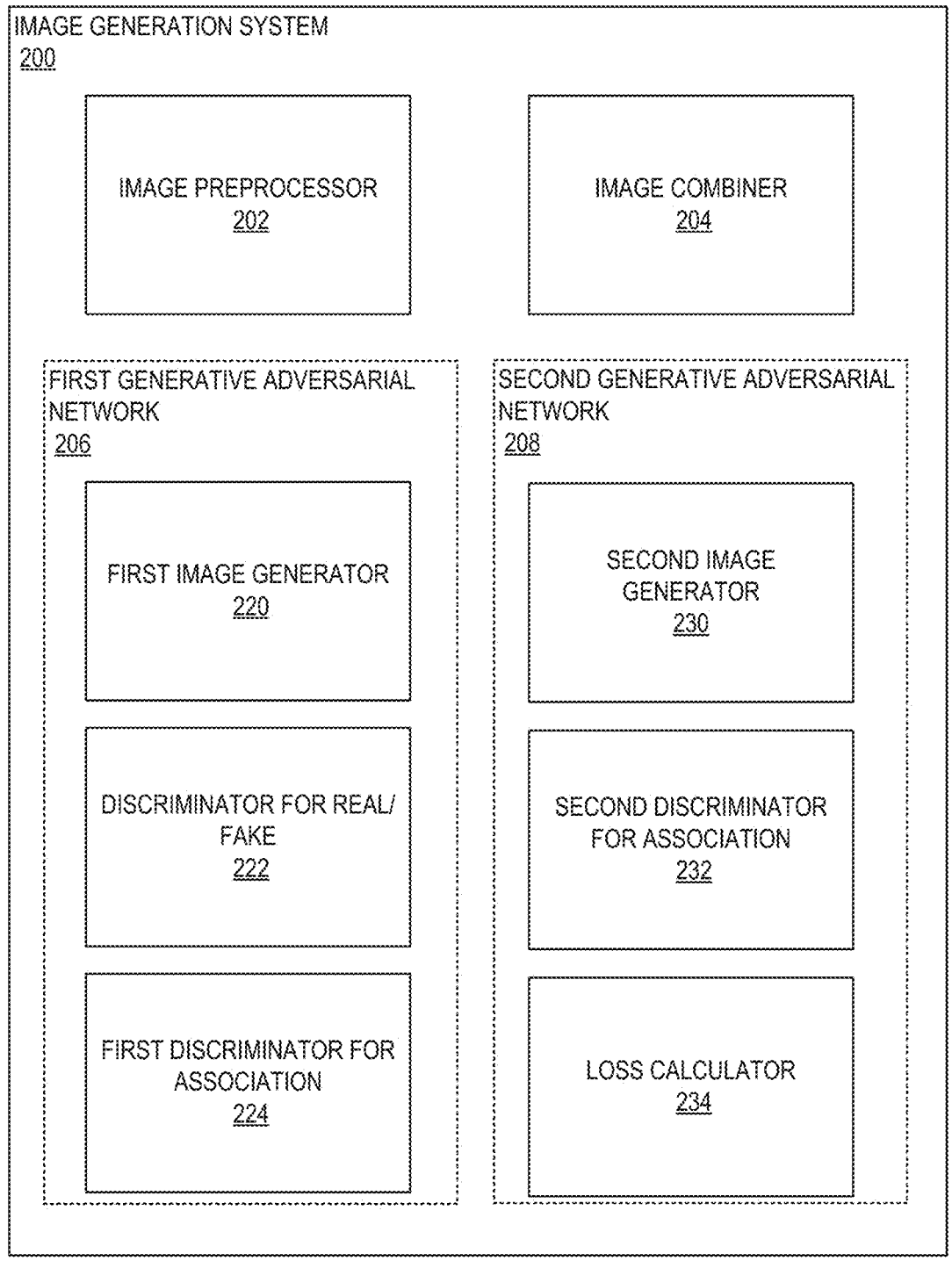
FIG. 2 is a block diagram illustrating an example image generation system, in accordance with some embodiments.

FIG. 2 is a block diagram illustrating an example image generation system 200, in accordance with some embodiments. For various embodiments, the components and arrangement of components may vary from what is illustrated in FIG. 2. For instance, the image generation system 200 can include more or fewer components than the components shown in the FIG. 2. The various modules of the image generation system 200 may be configured to communicate with each other (e.g., via a bus, shared memory, or a switch). Any modules may be implemented using one or more processors 1010 (e.g., by configuring such one or more computer processors to perform functions described for that module) and hence may include one or more of the processors 1010.

As shown in FIG. 2, the image generation system 200 comprises an image pre-processor 202, an image combiner 204, a first GAN 206, and a second GAN 208. As shown, the first GAN 206 comprises a first image generator 220, a discriminator 222 for determining (e.g., classifying) whether a received image is real or fake (e.g., generated image), and a first discriminator 224 for determining (e.g., classifying) whether a received image is associated with another image. As also shown, the second GAN 208 comprises a second image generator 230, a second discriminator 232 for determining (e.g., classifying) whether a received image is associated with another image, and a loss calculator 234 for calculating a loss or difference between at least two images. According to some embodiments, the first GAN 206 facilitates training of the first image generator 220 by processing (e.g., training) the first GAN 206 using a user-provided image, and facilitates training the second image generator 230 by processing (e.g., training) the second GAN 206 using a combined image produced by combining (e.g., concatenating) the user-provided image with an image generated by the first generator 220 when the user-provided image is processed by the first GAN 206.

Once sufficiently trained, the first and the second image generators 220, 230 can generate a stock-quality image from a given user-provided image by: the first image generator 220 generating a first generated image based on the given user-provided image; and the second image generator 230 generating a second generated image based on a combined image produced by combining the given user-provided image with the first generated image. In such an instance, the second generated image represents a stock-quality image generated based on the given user-provided image. The first and second image generators 220, 230 may improve their ability to generate stock-quality images from user-provided images as the first GAN 206 and the second GAN 208 process (e.g., trains on) more user-provided images.

The image pre-processor 202 can receive as input an image (e.g., a user-provided image) depicting at least one object of interest and can pre-process the received image such that the resulting, pre-processed image depicts the at least one object with more focus than the received image. For some embodiments, the image pre-processor 202 receives an image depicting a person and an object (e.g., fashion item) with respect to the person, the image pre-processor 202 performs a person segmentation process on the received image (e.g., segments out the foreground from the background), and places the resulting image segments (e.g., the foreground segments) on a white background. For some embodiments, the image pre-processor 202 performs human pose estimation on at least one of the resulting image segments to identify key points within the resulting image segments, such as four torso key points for a fashion item that comprises a clothing top. As noted herein, the key points may identify different points of interest on a human individual depicted in the resulting image segments. The human post estimation may comprise spatio-temporal matching. For some embodiments, the image pre-processor 202 crops the at least one resulting image segment based on the key points identified by the image pre-processor 202.

Eventually, the image pre-processor 202 can output the pre-processed image based on a received image (e.g., a user-provided image). During training of the first and second image generators 220, 230, the pre-processed image can be provided for processing by the first GAN 206 and the second GAN 208. For use after training (e.g., for facilitating an image-based search as described herein), the pre-processed image can be provided to the first and second image generators 220, 230 for generation of a stock-quality image based on the pre-processed image.

The image combiner 204 receives a plurality of images and combines those images to produce a combined image. Depending on the embodiment, the image combiner 204 may combine the plurality of images by concatenating the plurality of images together. For example, the image combiner 204 may concatenate two images based on color channels, such as three color channels (e.g., RGB) of each of the two images. For some embodiments, the image combiner 204 receives the user-provided image provided to the first image generator 220, receives the first generated image generated by the first image generator 220 based on the user-provided image, and combines the user-provided image with the first generated image. This may occur when the first GAN 206 and the second GAN 208 process the user-provided image for training the first image generator 220 and the second image generator 230, or this may occur when the first and second generators 220, 230 are used to generate a stock-quality image based on the user-provided image. According to some embodiments, a combined image produced by the image combiner 204 is provided to the second image generator 230 of the second GAN 208.

The first image generator 220 receives an input image and generates an output image based on the input image using a ML model, such as a neural network. According to some embodiments, the first image generator 220 receives a user-provided image and generates a first generated image using an encoder-decoder neural network of the first image generator 220. Likewise, the second image generator 230 receives an input image and generates an output image based on the input image using a ML model, such as a neural network. According to some embodiments, the second image generator 230 receives a combined image produced by the image combiner 204, and generates a second generated image using an encoder-decoder neural network of the second image generator 230.

During training for the first image generator 220 (e.g., by processing an image using the first GAN 206), a set of attributes for the first image generator 220, which may include one or more weights, may be adjusted based on a result of the discriminator 222, a result of the discriminator 224, or both. During training for the second image generator 230 (e.g., by processing an image using the second GAN 208), a set of attributes for the second image generator 230, which may include one or more weights, may be adjusted based on a result of the discriminator 232, a result of the loss calculator 234, or both.

The discriminator 222 receives an input image and determines whether the received image is real or fake. According to some embodiments, the discriminator 222 receives the first generated image generated by the first image generator 220, receives a ground-truth image (e.g., a stock image representing an item of interest depicted in the user-provided image), and determines whether the first generated image is real or fake based on (e.g., in comparison to) the ground-truth image.

The first and second discriminators 224, 232 each receive at least two input images and determine whether the received images are associated with each other. According to some embodiments, the first discriminator 224 receives the first generated image generated by the first image generator 220, receives the user-provided image (one received by the first image generator 220 and the second image generator 230), and determines whether the first generated image and the user-provided image are associated. Additionally, for some embodiments, the second discriminator 232 receives the second generated image generated by the second image generator 230, receives the user-provided image (one received by the first image generator 220 and the second image generator 230), and determines whether the second generated image and the user-provided image are associated. As noted herein, one or more of the discriminators 222, 224, and 232 may comprise a ML model, such as a neural network implementing a classifier.

The loss calculator 234 calculates a loss or difference between at least two input images. According to some embodiments, the loss calculator 234 calculates the loss/difference using an L-2 loss function. For some embodiments, the loss calculator 234 receives the second image generated by the second image generator 230 and a ground-truth image (e.g., a stock image representing an item of interest depicted in the user-provided image).

Figure 3:
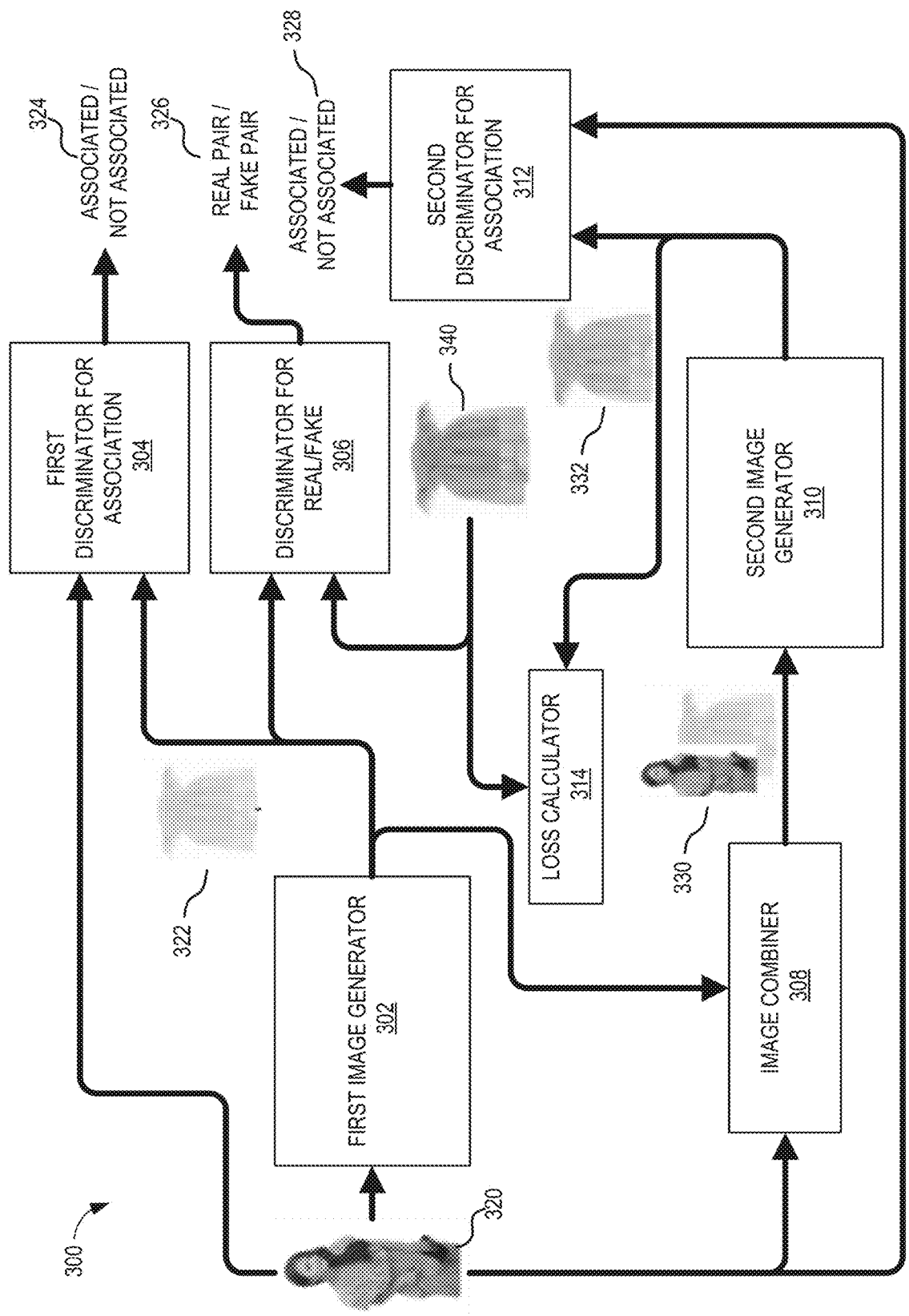
FIG. 3 is a flow diagram illustrating an example method for processing a user-provided image by a plurality of generative adversarial networks (GANs), in accordance with some embodiments.

FIG. 3 is a flow diagram illustrating an example method 300 for processing a user-provided image by a plurality of GANs, in accordance with some embodiments. As shown, a user-provided image 320 is provided as input to a first image generator 302, which generates a first generated image 322. A first discriminator 304 determines whether the user-provided image 320 and the first generated image 322 are associated or not associated and generates a result 324 accordingly. A discriminator 306 determines whether the first generated image 322 is real or fake based on a ground-truth image 340 (e.g., a stock image representing an item of interest depicted in the user-provided image 320, such as one from an online product catalog by a manufacturer) and generates a result 326 accordingly. An image combiner 308 receives the user-provided image 320 and the first generated image 322, and combines (e.g., concatenates) the user-provided image 320 and the first generated image 322 to produce a combined image 330. The combined image 330 is provided to a second image generator 310, which generates a second generated image 332 based on the combined image 330. A second discriminator 312 determines whether the user-provided image 320 and the second generated image 332 are associated or not associated and generates a result 328 accordingly. A loss calculator 314 calculates a loss or difference between the second generated image 332 and the ground-truth image 340.

According to some embodiments, the first image generator 302 and the discriminators 304, 306 are part of a first GAN; and the second image generator 310, and the discriminator 312, the loss calculator 314 are part of a second GAN. Additionally, according to some embodiments, the method 300 illustrates the first image generator 302 being trained by processing the user-provided image 320 by the first GAN, and the second image generator 310 being trained by processing the user-provided image 320 by the second GAN. For some embodiments, one or more attributes (e.g., weights) of the first image generator 302 are adjusted based on the result 324, the result 326, or both, thereby training the first image generator 302. For some embodiments, one or more attributes (e.g., weights) of the second image generator 310 are adjusted based on the result 328, a loss/difference calculated by the loss calculator 314, or both, thereby training the second image generator 310.

For some embodiments, the process of training the first image generator 302 using the user-provided image 320 is repeated iteratively (e.g., by processing the user-provided image 320 by the first image generator 302 and discriminators 304, 306 and adjusting the first image generator 302 accordingly) until the first image generator 302 can fool both the discriminators 304, 306. Likewise, for some embodiments, after the first image generator 306 has been trained (e.g., sufficiently trained) and generated the combined image 330, the process of training the second image generator 310 using the combined image 330 is repeated iteratively (e.g., by processing the combined image 330 by the second image generator 310 and discriminator 312 and adjusting the second image generator 310 accordingly) until the second image generator 310 can fool the discriminator 312.

Depending on the embodiment, one or more of the discriminators 304, 306, 312 may be trained and updated (to distinguish between images) in parallel, or prior to, the training and updating of the first and second image generators 302, 310. For instance, the first image generator 302 and the discriminators 304, 306 can be trained in parallel by updating (e.g., updating respective attributes of) the first image generator 302 and the discriminators 304, 306 using the user-provided image 320 (e.g., comprising a pre-processed image based on an original user-provided image) until the first image generator 302 and the discriminators 304, 306 converge. Subsequently, the second image generator 310 and discriminator 312 can be trained in parallel by iteratively updating (e.g., updating respective attributes of) the second image generator 310 and discriminator 312 using the combined image 330 until the second image generator 310 and discriminator 312 converge.

Once the first and second image generators 302, 310 are trained (e.g., sufficiently trained), a user-provided image can be processed by the first image generator 302 to generate a first generated image, the user-provided image can be combined with the first generated image to generate a combined image, and the combined image can be processed by the second image generator 310 to generate a second generated image. The second generated image can represent an image that can be used for subsequent processes or application described herein, such as a performing an image-based search of one or more images in a database.

FIGS. 4-7 are flow diagrams illustrating example image generation methods, in accordance with some embodiments. It will be understood that example methods described herein may be performed by a machine, in accordance with some embodiments. For example, the method 400 may be performed by the image generation system 200. An operation of various methods described herein may be performed by a processor (e.g., a central processing unit or graphics processing unit) of a machine (e.g., a desktop, server, laptop, mobile phone, tablet, or other computing device), which may be part of a computing system based on a cloud architecture. Example methods described herein may also be implemented in the form of executable instructions stored on a machine-readable medium or in the form of electronic circuitry. For instance, the operations of a method 400 of FIG. 4 may be represented by executable instructions that, when executed by a processor of a machine, cause the machine to perform the method 400. Depending on the embodiment, an operation of an example method described herein may be repeated in different ways or involve intervening operations not shown. Although the operations of example methods may be depicted and described in a certain order, the order in which the operations are performed may vary among embodiments, including performing certain operations in parallel.

Figure 4:
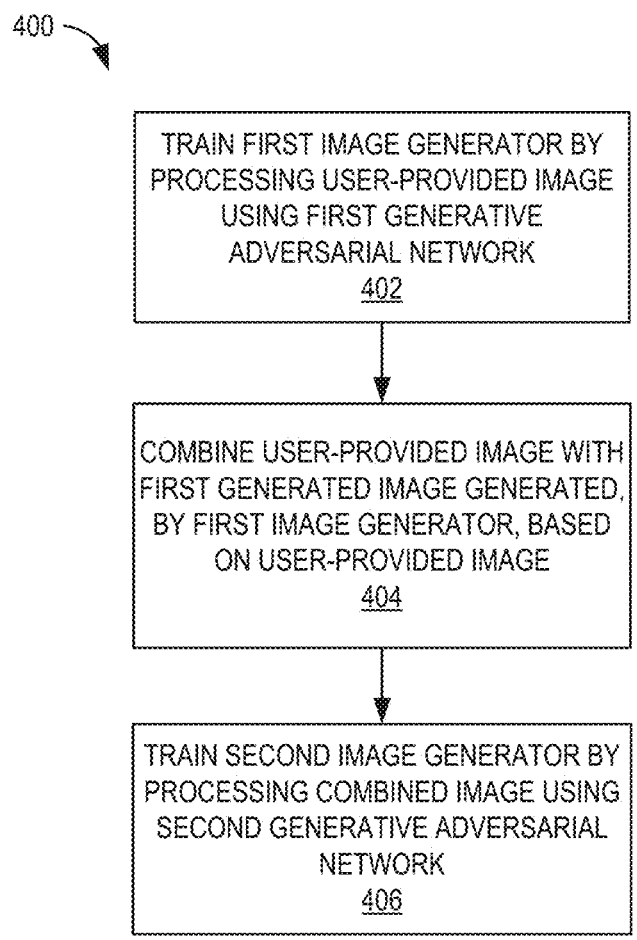
FIGS. 4-7 are flow diagrams illustrating example image generation methods, in accordance with some embodiments.

Referring now to the FIG. 4, as shown, the method 400 begins with operation 402 training a first image generator (e.g., the first image generator 220) by processing a user-provided image using a first GAN (e.g., the first GAN 206), which produces a first generated image based on the user-provided image. The user-provided image may depict at least one object of interest, and the first GAN comprises the first image generator, a first discriminator, and a second discriminator. Processing the user-provided image using the first GAN may comprise training the first GAN using the user-provided image. As described herein, the training of the first image generator using the first GAN may be an iterative process, and may be performed in parallel with the training of the first and second discriminators. More regarding training a first image generator by processing a use-provided image using a first GAN is discussed herein with respect to a method 600 of FIG. 6.

The method 400 continues with operation 404 combining (e.g., by the image combiner 204) the first generated image (produced by operation 402) with the user-provided image used by the first image generator at operation 402, which results in a combined image.

The method 400 continues with operation 406 training a second image generator (e.g., the second image generator 230) by processing the combined image (produced by operation 404) using a second GAN (e.g., the second GAN 208), which produces a second generated image based on the combined image. Processing the combined image using the second GAN may comprise training the second GAN using the user-provided image. As described herein, the training of the first image generator using the first GAN may be an iterative process, and may be performed in parallel with the training of the first and second discriminators. More regarding training a second image generator by processing a combined image using a second GAN is discussed herein with respect to a method 700 of FIG. 7.

Figure 5:
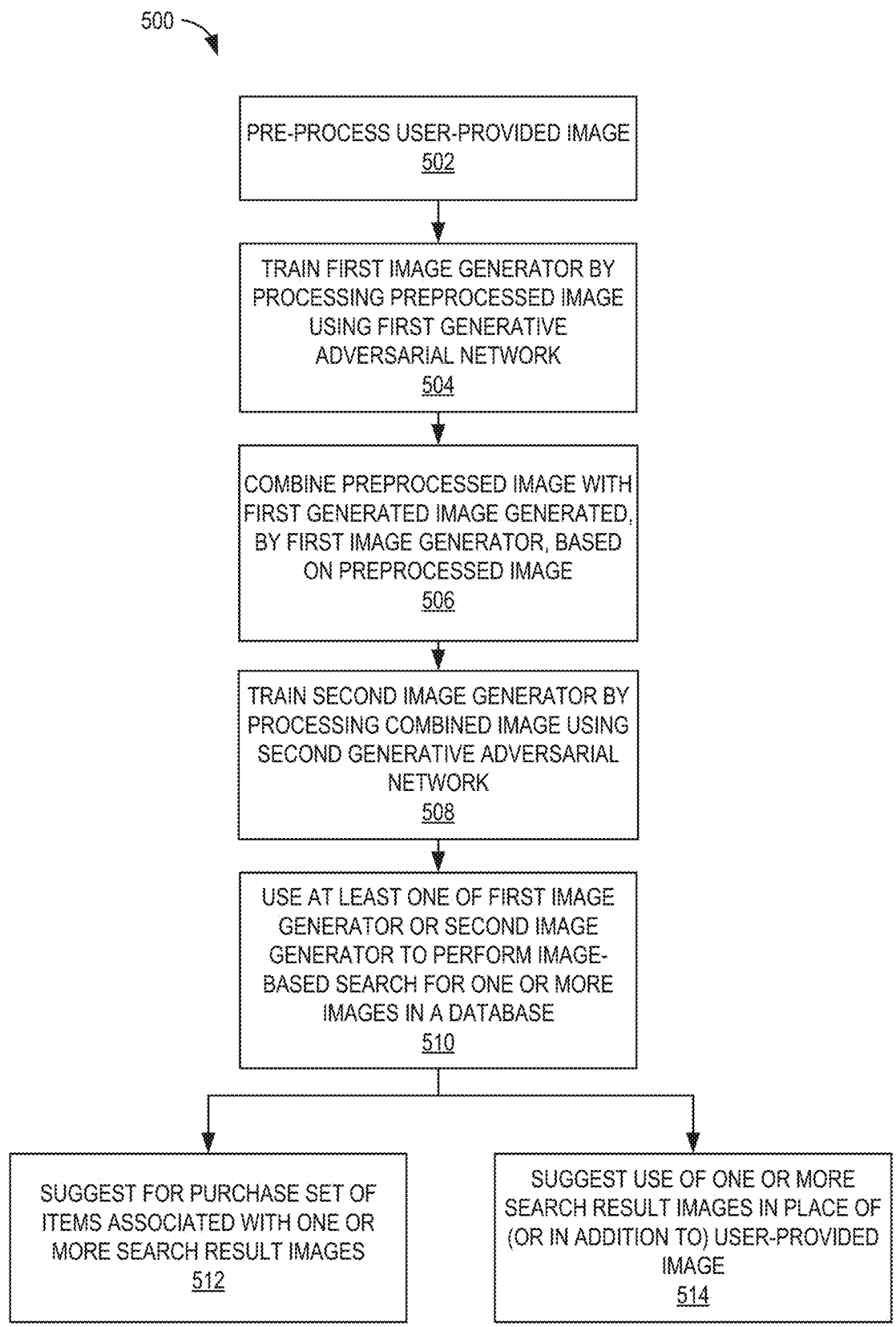

Referring now to FIG. 5, the method 500 begins with operation 502 pre-processing a user-provided image (e.g., by the image pre-processor 202) to produce a pre-processed image. For example, the user-provided image is pre-processed by: performing a person segmentation process on the user-captured image to produce a segmented image; disposing at least one image segment (e.g., foreground segment) of the segmented image on a white background to produce an intermediate image; performing a human pose estimation process on the intermediate image to identify a plurality of points of interest in the intermediate image; and cropping the intermediate image based on the plurality of points of interest to produce the pre-processed image. The object of interest may comprise a fashion item (e.g., clothing top, pants, skirt, shoes, hat, sunglasses, etc.), which may be worn by a human individual depicted in the user-provided image. For instance, the object of interest comprises a clothing top and the plurality of points of interest corresponding to a torso portion of the human individual.

The method 500 continues with operation 504 training a first image generator (e.g., the first image generator 220) by processing the pre-processed image (produced by operation 502) using a first GAN (e.g., the first GAN 206), which produces a first generated image based on the user-provided image. For some embodiments, operation 504 is similar to operation 402 of the method 400 described above with respect to FIG. 4. The method 500 then continues with operations 506 and 508, which according to some embodiments, are similar to operations 404 and 406 of the method 400 described above with respect to FIG. 4.

The method 500 continues with operation 510 where at least one of the first image generator (e.g., the first image generator 220) or the second image generator (e.g., the second generator 230) are used to perform an image-based search for one or more images in a database. For example, a new user-provided image is provided as input to the first image generator to generate a first generated image, the new user-provided image and the first generated image are combined to produce a combined image, and the combined image is provided as input to the second image generator to generate a second generated image. The second generated image may represent a stock-quality image generated from the new user-provided image. The second generated image may then be used as search input to perform the image-based search for the one or more images. In this way, the first image generator and the second image generator can enable an image-based search to be performed using the new user-provided image.

The method 500 may then continue with at least one of operation 512 or operation 514. Operation 512 causes a set of items, associated with one or more search result images produced by operation 510, to be suggested to a user (e.g., buyer user) for purchase, such as on an online marketplace system. For example, operation 512 may comprise: identifying a set of item records, in an item database of an online marketplace system, based on the set of item records being associated with the set of search result images; and causing a set of items associated with the set of item records to be presented at the client device as one or more items suggested for purchase through the online marketplace system Operation 514 causes one or more search result images produced by operation 510 to be suggested to a user (e.g., selling user) for use in place of, or in addition, to a new user-provided image (e.g., user-provided image not from training data used to train the first and second image generators 220, 230) used to perform the image-based search at operation 510. The new user-provided image may be, for example, an image that the user uploads for use with an item listing on the online marketplace system. The one or more search result images may be suggested for use by the user in a listing for selling an item on an online marketplace system.

Figure 6:
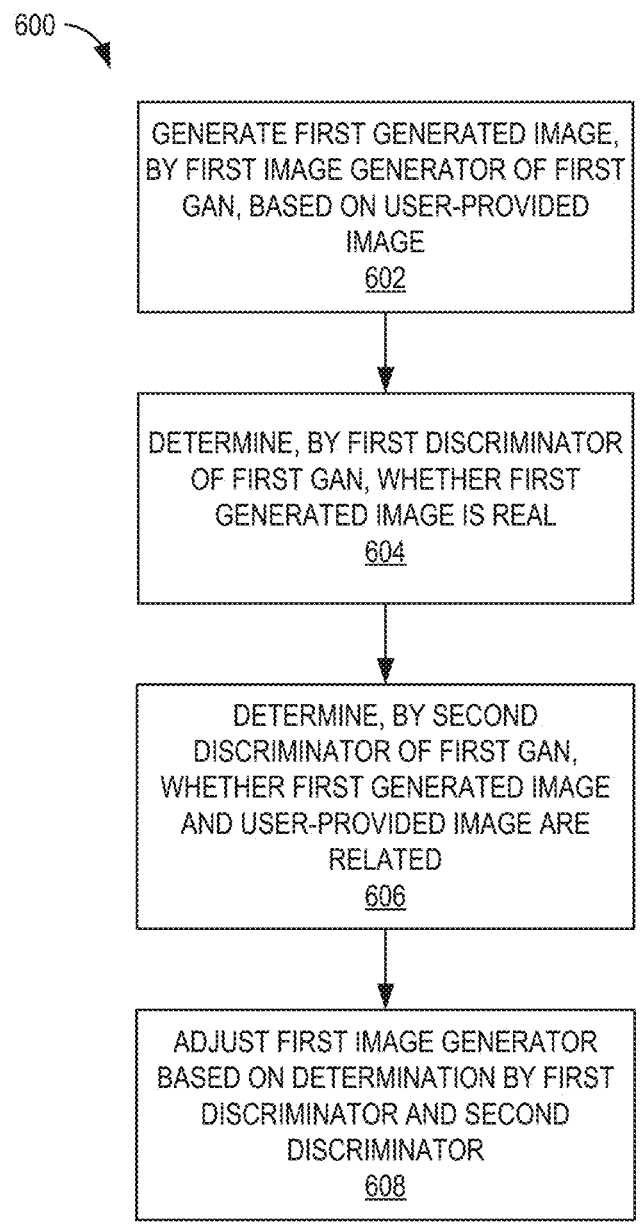

Referring now to FIG. 6, FIG. 6 illustrates an example method 600 for training an image generator (e.g., the first image generator 220) of a first GAN (e.g., the first GAN 206) by processing a user-provided image using the first GAN. As shown, the method 600 begins with operation 602 generating (e.g., by the first image generator 220) a first generated image based on the user-provided image. The method 600 continues with operation 604 determining (e.g., by the discriminator 222) whether the first generated image is a real image based on a ground-truth image (e.g., a stock image depicting the same object of interest as the user-provided image). The method 600 continues with operation 606 determining (e.g., by the first discriminator 224) whether the user-provided image and the first generated image are associated. The method 600 continues with operation 608 adjusting the first image generator (e.g., the first image generator 220) based on a result of determining (e.g., by the discriminator 222) whether the first generated image is a real image based on a ground-truth image and a result of determining (e.g., by the first discriminator 224) whether the user-provided image and the first generated image are associated. For some embodiments, the method 600 is performed iteratively until the image generator (e.g., 220) of the first GAN is capable of fooling its associated discriminators (e.g., 222, 224). Additionally, for some embodiments, the method 600 may be performed in parallel, or in combination, with iterative training and updating of the associated discriminators until the image generator and the associated discriminators converge.

Figure 7:
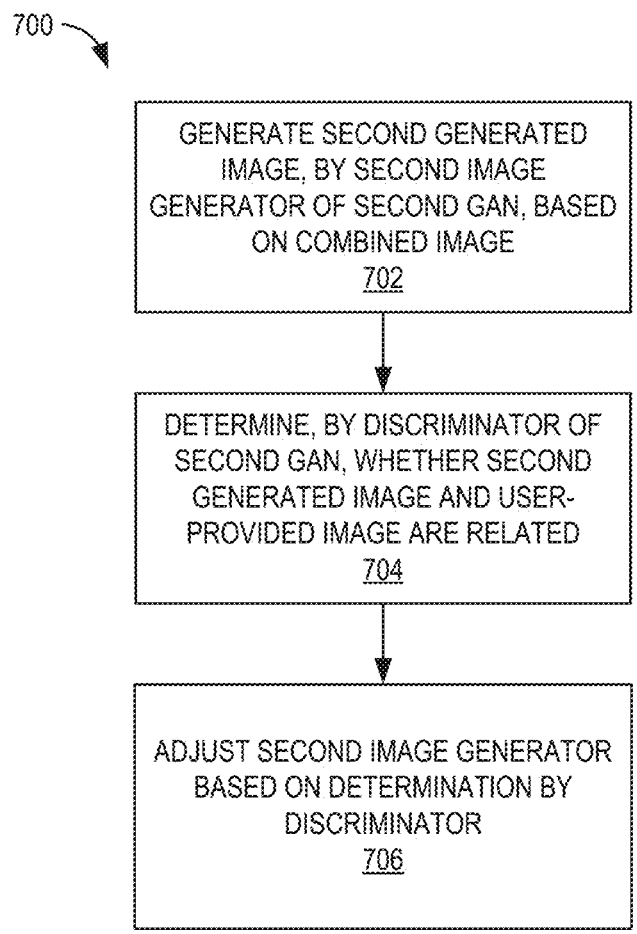

Referring now to FIG. 7, FIG. 7 illustrates an example method 700 for training an image generator (e.g., the second image generator 230) of a second GAN (e.g., the second GAN 208) by processing a combined image using the second GAN. As shown, the method 700 begins with operation 702 generating (e.g., by the second image generator 230) a second generated image based on a combined image produced by combining (e.g., via the image combiner 204) a first generated image (e.g., generated by the first image generator 220) and a user-provided image. The method 700 continues with operation 704 determining (e.g., by the second discriminator 232) whether the second generated image (at operation 702) is associated with the user-provided image. The method 700 continues with operation 706 adjusting the second image generator (e.g., 230) based on a result of determining (e.g., by the second discriminator 232) whether the second generated image is associated with the user-provided image. For some embodiments, the method 700 is performed iteratively until the image generator (e.g., 230) of the first GAN is capable of fooling its associated discriminator (e.g., 232). Additionally, for some embodiments, the method 700 may be performed in parallel, or in combination, with iterative training and updating of the associated discriminator until the image generator and the associated discriminator converge.

Figure 8:
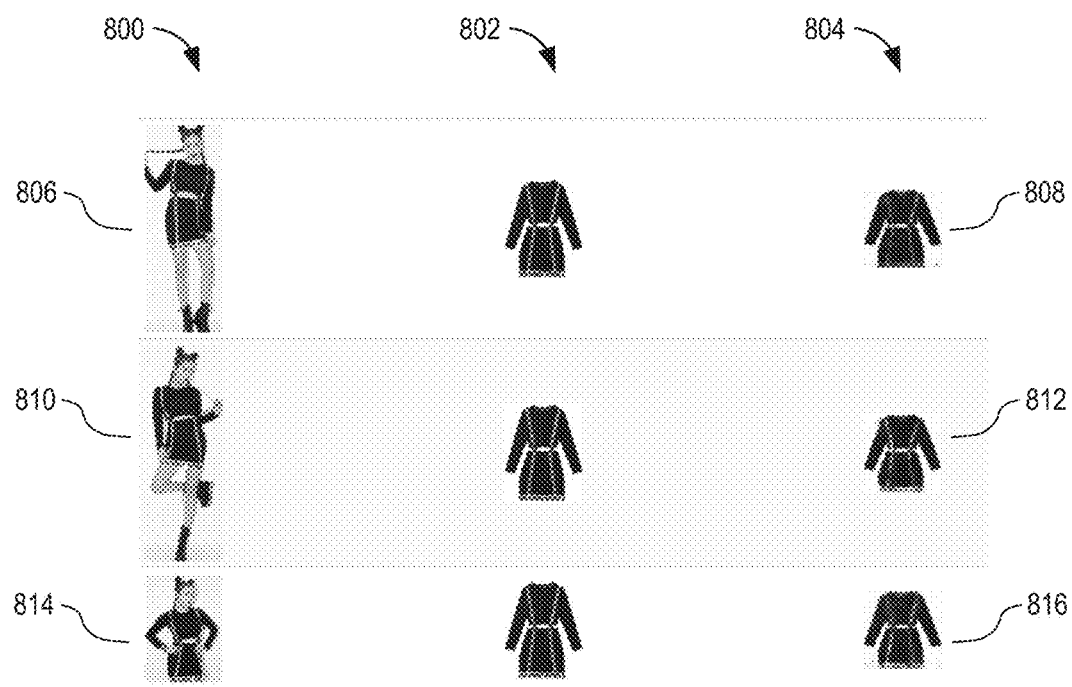
FIG. 8 presents example images generated based on user-provided images, in accordance with some embodiments.

FIG. 8 presents example images 804 generated based on user-provided images 800, in accordance with some embodiments. In particular, stock image 802 may represent a ground-truth image, each of the user-provided images 800 may represent an image captured by a user on the "street," and each of the generated images 804 may represent a stock-quality image generated by the first image generator 220 and the second image generator 230 after sufficient training. Each of the user-provided images 800 depicts the same human individual, in different poses, and wearing a particular fashion item of interest represented by the stock image 802. According to some embodiments, the user-provided images 806, 810, 814 are each processed by the first image generator 220 and the second image generator 230 to respectively produce stock-quality image 808, 812, 816.

Figure 9:
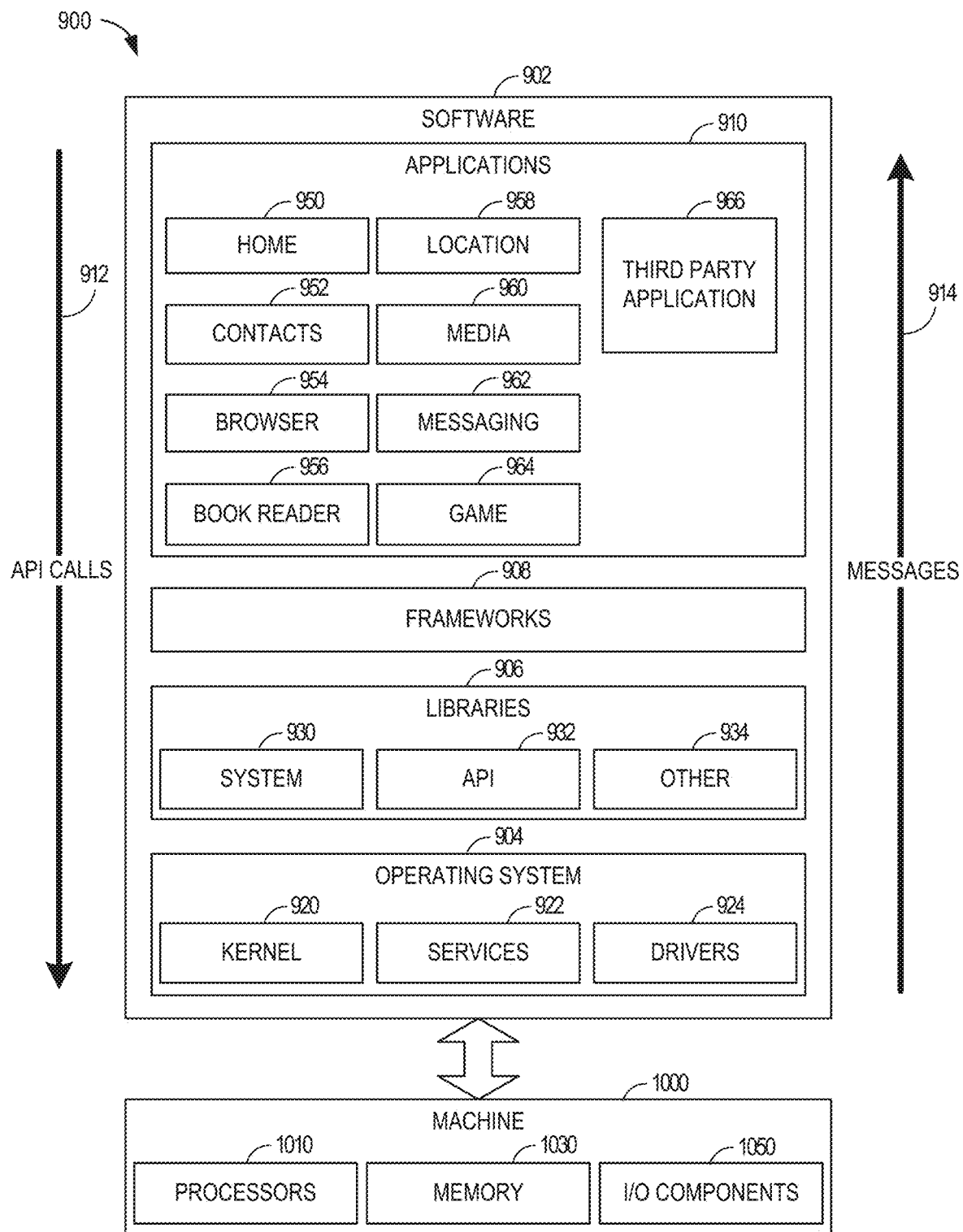
FIG. 9 is a block diagram illustrating an architecture of software, which can be installed on any one or more of the devices described above.

FIG. 9 is a block diagram 900 illustrating an architecture of software 902, which can be installed on any one or more of the devices described above. FIG. 9 is merely a non-limiting example of a software architecture, and it will be appreciated that many other architectures can be implemented to facilitate the functionality described herein. In various embodiments, the software 902 is implemented by hardware such as a machine 1000 of FIG. 10 that includes processors 1010, memory 1030, and input/output (I/O) components 1050. In this example architecture, the software 902 can be conceptualized as a stack of layers where each layer may provide a particular functionality. For example, the software 902 includes layers such as an operating system 904, libraries 906, frameworks 908, and applications 910. Operationally, the applications 910 invoke API calls 912 through the software stack and receive messages 914 in response to the API calls 912, consistent with some embodiments.

In various implementations, the operating system 904 manages hardware resources and provides common services. The operating system 904 includes, for example, a kernel 920, services 922, and drivers 924. The kernel 920 acts as an abstraction layer between the hardware and the other software layers, consistent with some embodiments. For example, the kernel 920 provides memory management, processor management (e.g., scheduling), component management, networking, and security settings, among other functionality. The services 922 can provide other common services for the other software layers. The drivers 924 are responsible for controlling or interfacing with the underlying hardware, according to some embodiments. For instance, the drivers 924 can include display drivers, camera drivers, BLUETOOTH® or BLUETOOTH® Low-Energy drivers, flash memory drivers, serial communication drivers (e.g., Universal Serial Bus (USB) drivers), Wi-Fi® drivers, audio drivers, power management drivers, and so forth.

In some embodiments, the libraries 906 provide a low-level common infrastructure utilized by the applications 910. The libraries 906 can include system libraries 930 (e.g., C standard library) that can provide functions such as memory allocation functions, string manipulation functions, mathematic functions, and the like. In addition, the libraries 906 can include API libraries 932 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or PG), or Portable Network Graphics (PNG)), graphics libraries (e.g., an OpenGL framework used to render in two dimensions (2D) and three dimensions (3D) in a graphic context on a display), database libraries (e.g., SQLite to provide various relational database functions), web libraries (e.g., WebKit to provide web browsing functionality), and the like. The libraries 906 can also include a wide variety of other libraries 934 to provide many other APIs to the applications 910.

The frameworks 908 provide a high-level common infrastructure that can be utilized by the applications 910, according to some embodiments. For example, the frameworks 908 provide various graphic user interface (GUI) functions, high-level resource management, high-level location services, and so forth. The frameworks 908 can provide a broad spectrum of other APIs that can be utilized by the applications 910, some of which may be specific to a particular operating system or platform.

In an example embodiment, the applications 910 include a home application 950, a contacts application 952, a browser application 954, a book reader application 956, a location application 958, a media application 960, a messaging application 962, a game application 964, and a broad assortment of other applications such as a third-party application 966. According to some embodiments, the applications 910 are programs that execute functions defined in the programs. Various programming languages can be employed to create one or more of the applications 910, structured in a variety of manners, such as object-oriented programming languages (e.g., Objective-C, Java, or C++) or procedural programming languages (e.g., C or assembly language). In a specific example, the third-party application 966 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 966 can invoke the API calls 912 provided by the operating system 904 to facilitate functionality described herein.

Figure 10:
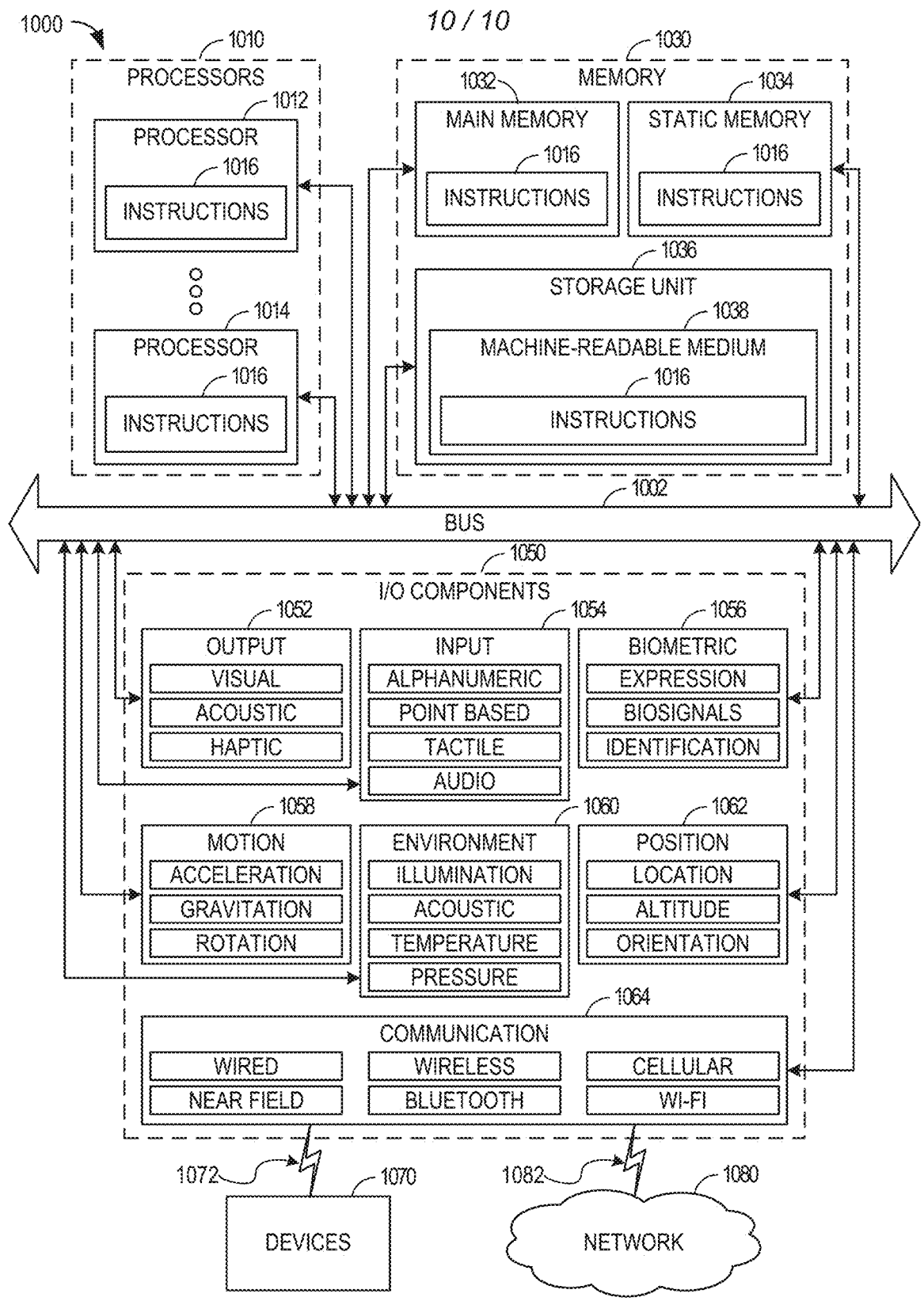
FIG. 10 illustrates a diagrammatic representation of a machine in the form of a computer system within which a set of instructions may be executed for causing the machine to perform any one or more of the methodologies discussed herein, according to an example embodiment.

FIG. 10 illustrates a diagrammatic representation of a machine 1000 in the form of a computer system within which a set of instructions may be executed for causing the machine to perform any one or more of the methodologies discussed herein, according to an example embodiment. Specifically, FIG. 10 shows a diagrammatic representation of the machine 1000 in the example form of a computer system, within which instructions 1016 (e.g., software, a program, an application, an apples, an app, or other executable code) for causing the machine 1000 to perform any one or more of the methodologies discussed herein may be executed. For example, the instructions 1016 may cause the machine 1000 to execute the methods 300, 400, 500, 600, 700, and 800 of FIGS. 3-8. The instructions 1016 transform the general, non-programmed machine 1000 into a particular machine 1000 programmed to carry out the described and illustrated functions in the manner described. In alternative embodiments, the machine 1000 operates as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1016, sequentially or otherwise, that specify actions to be taken by the machine 1000. Further, while only a single machine 1000 is illustrated, the term "machine" shall also be taken to include a collection of machines 1000 that individually or jointly execute the instructions 1016 to perform any one or more of the methodologies discussed herein.

The machine 1000 may include processors 1010, memory 1030, and I/O components 1050, which may be configured to communicate with each other such as via a bus 1002. In an example embodiment, the processors 1010 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an application-specific integrated circuit (ASIC), a Radio-Frequency Integrated Circuit (RFIC), another processor, or any suitable combination thereof) may include, for example, a processor 1012 and a processor 1014 that may execute the instructions 1016. The term "processor" is intended to include multi-core processors that may comprise two or more independent processors (sometimes referred to as "cores") that may execute instructions contemporaneously. Although FIG. 10 shows multiple processors 1010, the machine 1000 may include a single processor with a single core, a single processor with multiple cores (e.g., a multi-core processor), multiple processors with a single core, multiple processors with multiples cores, or any combination thereof.

The memory 1030 may include a main memory 1032, a static memory 1034, and a storage unit 1036 including a machine-readable medium 1038, each accessible to the processors 1010 such as via the bus 1002. The main memory 1032, the static memory 1034, and the storage unit 1036 store the instructions 1016 embodying any one or more of the methodologies or functions described herein. The instructions 1016 may also reside, completely or partially, within the main memory 1032, within the static memory 1034, within the storage unit 1036, within at least one of the processors 1010 (e.g., within the processor's cache memory), or any suitable combination thereof, during execution thereof by the machine 1000.

The I/O components 1050 may include a wide variety of components to receive input, provide output, produce output, transmit information, exchange information, capture measurements, and so on. The specific I/O components 1050 that are included in a particular machine will depend on the type of machine. For example, portable machines such as mobile phones will likely include a touch input device or other such input mechanisms, while a headless server machine will likely not include such a touch input device. It will be appreciated that the I/O components 1050 may include many other components that are not shown in FIG. 10. The I/O components 1050 are grouped according to functionality merely for simplifying the following discussion, and the grouping is in no way limiting. In various example embodiments, the I/O components 1050 may include output components 1052 and input components 1054. The output components 1052 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1054 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 1050 may include biometric components 1056, motion components 1058, environmental components 1060, or position components 1062, among a wide array of other components. For example, the biometric components 1056 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1058 may include acceleration sensor components (e.g., accelerometer), gravitation sensor components, rotation sensor components (e.g., gyroscope), and so forth. The environmental components 1060 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 1062 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1050 may include communication components 1064 operable to couple the machine 1000 to a network 1080 or devices 1070 via a coupling 1082 and a coupling 1072, respectively. For example, the communication components 1064 may include a network interface component or another suitable device to interface with the network 1080. In further examples, the communication components 1064 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1070 may be another machine or any of a wide variety of peripheral devices (e.g., a peripheral device coupled via a USB).

Moreover, the communication components 1064 may detect identifiers or include components operable to detect identifiers. For example, the communication components 1064 may include radio-frequency identification (RFID) tag reader components, NFC smart tag detection components, optical reader components (e.g., an optical sensor to detect one-dimensional bar codes such as Universal Product Code (UPC) bar code, multi-dimensional bar codes such as QR code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1064, such as location via Internet Protocol (IP) geolocation, location via Wi-Fi® signal triangulation, location via detecting an NFC beacon signal that may indicate a particular location, and so forth.

Executable Instructions and Machine Storage Medium

The various memories (i.e., 1030, 1032, 1034, and/or memory of the processor(s) 1010) and/or the storage unit 1036 may store one or more sets of instructions and data structures (e.g., software) embodying or utilized by any one or more of the methodologies or functions described herein. These instructions (e.g., the instructions 1016), when executed by the processor(s) 1010, cause various operations to implement the disclosed embodiments.

As used herein, the terms "machine-storage medium," "device-storage medium," and "computer-storage medium" mean the same thing and may be used interchangeably. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

Transmission Medium

In various example embodiments, one or more portions of the network 1080 may be an ad hoc network, an intranet, an extranet, a virtual private network (VPN), a local-area network (LAN), a wireless LAN (WLAN), a WAN, a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 1080 or a portion of the network 1080 may include a wireless or cellular network, and the coupling 1082 may be a Code Division Multiple Access (CDMA) connection, a Global System for Mobile communications (GSM) connection, or another type of cellular or wireless coupling. In this example, the coupling 1082 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

The instructions 1016 may be transmitted or received over the network 1080 using a transmission medium via a network interface device (e.g., a network interface component included in the communication components 1064) and utilizing any one of a number of well-known transfer protocols (e.g., HTTP). Similarly, the instructions 1016 may be transmitted or received using a transmission medium via the coupling 1072 (e.g., a peer-to-peer coupling) to the devices 1070. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 1016 for execution by the machine 1000, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

Computer-Readable Medium

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

Throughout this specification, plural instances may implement resources, components, operations, or structures described as a single instance. Although individual operations of one or more methods are illustrated and described as separate operations, one or more of the human individual operations may be performed concurrently, and nothing requires that the operations be performed in the order illustrated.

As used herein, modules may constitute software modules (e.g., code stored or otherwise embodied in a machine-readable medium or in a transmission medium), hardware modules, or any suitable combination thereof. A "hardware module" is a tangible (e.g., non-transitory) physical component (e.g., a set of one or more processors) capable of performing certain operations and may be configured or arranged in a certain physical manner. In various embodiments, one or more computer systems or one or more hardware modules thereof may be configured by software (e.g., an application or portion thereof) as a hardware module that operates to perform operations described herein for that module.

In some embodiments, a hardware module may be implemented electronically. For example, a hardware module may include dedicated circuitry or logic that is permanently configured to perform certain operations. A hardware module may be or include a special-purpose processor, such as a field programmable gate array (FPGA) or an ASIC. A hardware module may also include programmable logic or circuitry that is temporarily configured by software to perform certain operations. As an example, a hardware module may include software encompassed within a CPU or other programmable processor. It will be appreciated that the decision to implement a hardware module mechanically, hydraulically, in dedicated and permanently configured circuitry, or in temporarily configured circuitry (e.g., configured by software) may be driven by cost and time considerations.

Accordingly, the phrase "hardware module" should be understood to encompass a tangible entity that may be physically constructed, permanently configured (e.g., hardwired), or temporarily configured (e.g., programmed) to operate in a certain manner or to perform certain operations described herein. Furthermore, as used herein, the phrase "hardware-implemented module" refers to a hardware module. Considering embodiments in which hardware modules are temporarily configured (e.g., programmed), each of the hardware modules need not be configured or instantiated at any one instance in time. For example, where a hardware module includes a CPU configured by software to become a special-purpose processor, the CPU may be configured as respectively different special-purpose processors (e.g., each included in a different hardware module) at different times. Software (e.g., a software module) may accordingly configure one or more processors, for example, to become or otherwise constitute a particular hardware module at one instance of time and to become or otherwise constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over suitable circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory (e.g., a memory device) to which it is communicatively coupled. A further hardware module may then, at a later time, access the memory to retrieve and process the stored output. Hardware modules may also initiate communications with input or output devices and can operate on a resource (e.g., a collection of information from a computing resource).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module in which the hardware includes one or more processors. Accordingly, the operations described herein may be at least partially processor-implemented, hardware-implemented, or both, since a processor is an example of hardware, and at least some operations within any one or more of the methods discussed herein may be performed by one or more processor-implemented modules, hardware-implemented modules, or any suitable combination thereof.

As used herein, the term "or" may be construed in either an inclusive or exclusive sense. The terms "a" or "an" should be read as meaning "at least one," "one or more" or the like. The presence of broadening words and phrases such as "one or more," "at least," "but not limited to," or other like phrases in some instances shall not be read to mean that the narrower case is intended or required in instances where such broadening phrases may be absent. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate components in example configurations may be implemented as a combined structure or component. Similarly, structures and functionality presented as a single component may be implemented as separate components. The specification and drawings are, accordingly, to be regarded in an illustrative rather than a restrictive sense.

Boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

It will be understood that changes and modifications may be made to the disclosed embodiments without departing from the scope of the present disclosure. These and other changes or modifications are intended to be included within the scope of the present disclosure.

What is claimed is:

1. A method comprising:
   producing, by one or more processors, a processed image based on a user-captured image by processing the user-captured image to focus on at least one object of interest depicted in the user-captured image, the object of interest comprising an article of clothing being worn by a human individual;
   training, by the one or more processors, a first image generator by processing the processed image using a first generative adversarial network, the processed image depicting the at least one object of interest, the first generative adversarial network comprising the first image generator, a first discriminator, and a second discriminator, and the training the first image generator by the first generative adversarial network comprises:
      generating, by the first image generator, a first generated image based on the processed image;
      determining, by the first discriminator, whether the first generated image is a real image based on a reference image;
      determining, by the second discriminator, whether the processed image and the first generated image are associated; and
      adjusting the first image generator based on a result of the determining by the first discriminator and a result of the determining by the second discriminator;
   combining, by the one or more processors, the processed image and the first generated image to produce a combined image; and
   training, by the one or more processors, a second image generator by processing the processed image using a second generative adversarial network, the second generative adversarial network comprising the second image generator and a third discriminator, and the training the second image generator by the second generative adversarial network comprises:
      generating, by the second image generator, a second generated image based on the combined image;
      determining, by the third discriminator, whether the second generated image is associated with the processed image; and
      adjusting the second image generator based on a result of the determining by the third discriminator.

2. The method of claim 1, wherein the producing the processed image based on the user-captured image comprises:
   performing a person segmentation process on the user-captured image to produce a segmented image;
   disposing at least one segment of the segmented image on a white background to produce an intermediate image;
   performing a human pose estimation process on the intermediate image to identify a plurality of points of interest in the intermediate image; and
   cropping the intermediate image based on the plurality of points of interest to produce the processed image.

3. The method of claim 2, wherein the article of clothing comprises a clothing top being worn by the human individual, and the plurality of points of interest correspond to a torso portion of the human individual.

4. The method of claim 1, wherein the first image generator comprises a first encoder-decoder neural network and the second image generator comprises a second encoder-decoder neural network.

5. The method of claim 1, wherein the training the second image generator by processing the processed image using the second generative adversarial network further comprises:
calculating, by a L-2 loss function, a difference between the second generated image and the reference image, the adjusting the second image generator further based on the difference.

6. The method of claim 1, further comprising:
using, by the one or more processors, at least one of the first image generator or the second image generator to perform an image-based search for one or more images in an image database to produce a set of search result images, the image-based search being performed based on an input image.

7. The method of claim 6, wherein the using the at least one of the first image generator or the second image generator to perform the image-based search for the one or more images in the image database to produce the set of search result images comprises:
accessing the input image provided by a client device;
processing the input image using the first image generator and the second image generator to generate an output image; and
performing the image-based search using the output image.

8. The method of claim 6, further comprising:
identifying, by the one or more processors, a set of item records, in an item database of an online marketplace system, based on the set of item records being associated with the set of search result images; and
causing, by the one or more processors, a set of items associated with the set of item records to be presented at a client device as one or more items suggested for purchase through the online marketplace system.

9. The method of claim 6, wherein the input image is provided for a listing of an item for sale on an online marketplace system, the method further comprising:
causing, by the one or more processors, the set of search result images to be provided to a client device as one or more suggested images for use with the listing.

10. The method of claim 1, further comprising:
accessing, by the one or more processors, an input image provided by a client device;
processing, by the one or more processors, the input image using the first image generator to produce a first intermediate image;
combining, by the one or more processors, the input image with the intermediate image to produce a second intermediate image; and
processing, by the one or more processors, the second intermediate image using the second image generator to produce a generated output image.

11. The method of claim 1, wherein the combining the processed image and the first generated image to produce the combined image comprises concatenating the processed image and the first generated image to produce the combined image.

12. A system comprising:
one or more processors; and
a computer-readable medium having instructions stored there on, which, when executed by the one or more processors, cause the system to perform operations comprising:
producing a processed image based on a user-captured image by processing the user-captured image to focus on at least one object of interest depicted in the user-captured image, the object of interest comprising an article of clothing being worn by a human individual;
training a first image generator by processing the processed image using a first generative adversarial network, the processed image depicting the at least one object of interest, the first generative adversarial network comprising the first image generator, a first discriminator, and a second discriminator, and the training the first image generator by the first generative adversarial network comprises:
generating, by the first image generator, a first generated image based on the processed image;
determining, by the first discriminator, whether the first generated image is a real image based on to a reference image;
determining, by the second discriminator, whether the processed image and the first generated image are associated; and
adjusting the first image generator based on a result of the determining by the first discriminator and a result of the determining by the second discriminator;
combining the processed image and the first generated image to produce a combined image; and
training a second image generator by processing the processed image using a second generative adversarial network, the second generative adversarial network comprising the second image generator and a third discriminator, and the training the second image generator by the second generative adversarial network comprises:
generating, by the second image generator, a second generated image based on the combined image;
determining, by the third discriminator, whether the second generated image is associated with the processed image; and
adjusting the second image generator based on a result of the determining by the third discriminator.

13. The system of claim 12, wherein the instructions further cause the system to perform the operations of:
using at least one of the first image generator or the second image generator to perform an image-based search for one or more images in an image database to produce a set of search result images, the image-based search being performed based on an input image.

14. The system of claim 13, wherein the instructions further cause the system to perform the operations of:
identifying a set of item records, in an item database of an online marketplace system, based on the set of item records being associated with the set of search result images; and
causing a set of items associated with the set of item records to be presented at a client device as one or more items suggested for purchase through the online marketplace system.

15. The system of claim 13, wherein the using the at least one of the first image generator or the second image generator to perform the image-based search for the one or more images in the image database to produce the set of search result images comprises:

accessing the input image provided by a client device;

processing the input image using the first image generator and the second image generator to generate an output image; and performing the image-based search using the output image.

16. The system of claim 13, wherein the input image is provided for a listing of an item for sale on an online marketplace system, the instructions further causing the system to perform the operations of:

causing the set of search results to be provided to a client device as one or more suggested images for use with the listing.

17. The system of claim 12, wherein the training the second image generator by processing the processed image using the second generative adversarial network further comprises:

calculating, by a L-2 loss function, a difference between the second generated image and the reference image, the adjusting the second image generator further based on the difference.

18. The system of claim 12, wherein the instructions further cause the system to perform the operations of:

accessing an input image provided by a client device;

processing the input image using the first image generator to produce a first intermediate image;

combining the input image with the intermediate image to produce a second intermediate image; and processing the second intermediate image using the second image generator to produce a generated output image.

19. The system of claim 12, wherein the combining the processed image and the first generated image to produce the combined image comprises concatenating the user-provided image and the first generated image to produce the combined image.

20. A non-transitory computer-readable storage medium comprising instructions that, when executed by at least one processor of a machine, cause the machine to perform operations comprising:

producing a processed image based on a user-captured image by processing the user-captured image to focus on at least one object of interest depicted in the user-captured image, the object of interest comprising an article of clothing being worn by a human individual;

training a first image generator by processing the processed image using a first generative adversarial network, the processed image depicting the at least one object of interest, the first generative adversarial network comprising the first image generator, a first discriminator, and a second discriminator, and the training the first image generator by the first generative adversarial network comprises:

generating, by the first image generator, a first generated image based on the processed image;

determining, by the first discriminator, whether the first generated image is a real image based on to a reference image;

determining, by the second discriminator, whether the processed image and the first generated image are associated; and adjusting the first image generator based on a result of the determining by the first discriminator and a result of the determining by the second discriminator;

combining the processed image and the first generated image to produce a combined image; and training a second image generator by processing the processed image using a second generative adversarial network, the second generative adversarial network comprising the second image generator and a third discriminator, and the training the second image generator by the second generative adversarial network comprises:

generating, by the second image generator, a second generated image based on the combined image;

determining, by the third discriminator, whether the second generated image is associated with the processed image; and adjusting the second image generator based on a result of the determining by the third discriminator.

\* \* \* \* \*